United States Patent
Katz

[15] 3,678,153
[45] July 18, 1972

[54] DIFLUOROXALATOSTANNATE(II) COMPLEXES

[72] Inventor: Simon Katz, Indianapolis, Ind.

[73] Assignee: Indiana University Foundation, Bloomington, Ind.

[22] Filed: Jan. 20, 1971

[21] Appl. No.: 108,227

[52] U.S. Cl. .......................................... 424/52, 260/429.7
[51] Int. Cl. ....................................................... A61k 7/16
[58] Field of Search .............................. 424/52; 260/429.7

Primary Examiner—Richard L. Huff
Attorney—Ronald L. Engel, Daniel W. Vittum, Jr., Gomer W. Walters, John A. Waters and James M. Amend

[57] ABSTRACT

A new genus of compositions of matter, namely, difluoroxalatostannate(II) complexes has been discovered. These compounds when incorporated into oral compositions for dental caries prophylaxis (e.g., as a constituent of a dentifrice, prophylaxis paste, or mouthwash), have demonstrated substantial utility as an anticariogenic agent.

19 Claims, No Drawings

3,678,153

DIFLUOROXALATOSTANNATE(II) COMPLEXES

BACKGROUND OF THE INVENTION

1. Field of the Invention

This invention relates to a new genus of compounds, difluoroxalatostannate (II) complexes and to the use thereof as anticariogenic agents in oral compositions for caries prophylaxis. By the term "oral composition" is meant a product which in the ordinary course of usage is not intentionally ingested, but rather is retained in the oral cavity so as to contact the oral hard tissues.

2. Description of the Prior Art

It is commonly recognized that the presence of microquantities of fluoride in drinking water (e.g., 1.0 micrograms fluoride per milliliter) has a pronounced effect on reducing the incidence of dental caries in permanent teeth of children consuming such water from birth through 8 years of age. Fluoride salts have been introduced into public water supplies in many communities with good results. This method of caries prophylaxis is not available, however, to a large number of people whose drinking water is obtained from small, private fluoride-deficient sources such as individual wells, etc. Further, the addition of fluoride to common public water sources is not always accepted or permitted.

Topical applications of aqueous fluoride solutions by dentists or dental hygienists provide an excellent measure of protection against dental caries. Various fluoride compounds have been employed for this purpose, including sodium fluoride and stannous fluoride. Likewise, dentifrices and mouthwash compositions comprising various fluoride compounds are known to exhibit anticariogenic effectiveness.

Although effective dental caries protection has been obtained through the use of the aforementioned fluoride compounds, certain physical limitations have limited the efficacy of these agents. For example, the utility of certain prior art anticariogenic agents has been limited by the extent of their solubility in an aqueous media. For example, sodium fluoride (NaF) is only soluble to the extent of about 4 percent in water. Solubility can, of course, limit the quantity of anticariogenic ions provided by an agent that is available for reaction with the tooth surface. The relative insolubility of certain of the prior art anticariogenic agents limits the value of the same for the use in prophylactic paste compositions since the volume of water in prophylactic paste is substantially limited.

Finally, certain of the known prior art anticariogenic agents have been relatively unstable in aqueous solutions. For example, stannous ions are subject to oxidation and hydrolysis and, for that reason stannous containing compositions must ordinarily be in freshly prepared form or must be used in conjunction with complexing anions in order to obtain its optimal anticariogenic effect.

For these reasons and others, dental researchers have continued their efforts to develop new compositions which are not only anticariogenically more effective, but which also exhibit none of the difficulties associated with certain of the prior art anticariogenic agents.

It is generally believed that fluoride ion in functioning as a topical anticariogenic agent acts through the formation of insoluble calcium fluoride on the surface of the tooth enamel. It has also been suggested that the incorporation of fluoride into the enamel lattice through the substitution of fluoride for hydroxyl groups in the hydroxyapatite crystal of the enamel (so as to form fluoride-substituted hydroxyapatite) decreases the solubility of the enamel in oral acids.

The degree of the reaction between the fluoride and the enamel is limited by the relatively close proximity of the enamel crystals and by the formation of the calcium fluoride precipitate itself. In fact, the proximity between enamel crystals (which serves to prevent the passage of fluoride ions into the crystal lattice) has been suggested to be the main factor limiting the deep penetration of topical fluoride into the enamel crystal lattice. In addition to the electrostatic and mechanical barriers proposed by the close proximity of the enamel crystal, a second factor apparently limiting the possibility of fluoride uptake is the energy required for the fluoride-enamel reaction to proceed.

Because of the limitations posed on fluoride uptake, it would be desirable to provide a means for increasing the fluoride uptake and penetration into the enamel lattice, and this invention therefore has for its principal object to provide a new genus of compounds, difluoroxalatostannate (II) complexes, which increase the uptake of the fluoride ion by and reduce the acid solubility of dental enamel.

It is a further related object of the present invention to provide a new genus of compounds, difluoroxalatostannate (II) complexes, which exhibit a high level of anticariogenic effectiveness and which are nontoxic to living organisms at operable concentration levels.

A further object is to provide an adjunct to a topical fluoride system capable of temporarily loosening the enamel crystal lattice so as to permit fluoride ions to penetrate deeper, serving also to reduce the lattice energy so as to decrease the amount of energy required for a fluoride-enamel reaction to proceed.

Yet another object of the present invention is to provide an anticariogenic agent of the character described which is stable in aqueous solutions even at relatively high concentration.

Another object is to provide new and unique oral compositions characterized by the inclusion of a chelating agent in combination with a source of soluble fluoride ion or of a chelating agent complexed to a fluoride moiety.

A related object involves the provision of oral compositions comprising a source of soluble fluoride ion and a chelating agent to enhance the uptake of fluoride ion by the reduction of enamel solubility of dental enamel.

Yet another object is to provide new and improved methods for topically reducing the incidence of dental caries.

Another object is to provide a new method of increasing the uptake of tin (II) ions into the dental enamel crystal lattice.

SUMMARY OF THE INVENTION

The foregoing and other objects, advantages, and features of this invention may be achieved with new and more effective oral compositions for caries prophylaxis which utilize new compositions of matter, difluoroxalatostannate (II) complexes, as anticariogenic agents. Such oral compositions (which may take the form of dentifrices, prophylactic pastes, topical solutions, and mouthwashes) comprise from about 0.1 to 10 percent by weight of the difluoroxalatostannate(II) complexes.

DETAILED DESCRIPTION OF THE PREFERRED EMBODIMENTS

In accordance with the present invention, there have been discovered new compositions of matter, namely difluoroxalatostannate(II) complexes of the formula $M_2[SnF_2(C_2O_4)]$ where M+ is a metal or ion such as potassium, sodium or ammonium. In addition, water of hydration may be present in the molecule. The difluoroxalatostannate(II) complexes of this invention have, as will hereinafter be described in detail, demonstrated effectiveness as anticariogenic agents useful in oral compositions.

PREPARATION AND PROPERTIES

Difluoroxalatostannate(II) complexes may be prepared by various methods. In order to utilize the chelating ability of oxalic acid, $H_2C_2O_4$, plus the known cariostatic effect of tin(II) ions, the use of stannous oxalate was thought to be advantageous. Stannous oxalate, $SnC_2O_4$, is, however, insoluble in water. However, upon addition of sodium fluoride, NaF, it was discovered that the stannous oxalate precipitate became soluble. Complete solubility and complete transparency of the solution was found to occur when the fluoride salt was added to the oxalate salt in a 2:1 molar ratio. The pH of the resulting solution is 4.8. It was found that stannous oxalate reacts similarly with potassium fluoride $KF \cdot 2H_2O$, to provide a soluble product where the fluoride to oxalate ratio was 2:1.

Another method of preparing the difluoroxalatostannate(II) complexes of this invention involves the utilization of alkali metal hydroxides and hydrofluoric acid. A 1 mole stannous oxalate suspension having a pH of about 3.0 is prepared. Upon the addition of 2 moles of hydrofluoric acid, HF, the pH is reduced to 1.7–1.8 but the suspension remains turbid under stirring. Upon the addition of diluted sodium hydroxide, NaOH, the solution becomes clear when the pH approaches 4.8.

Another method of preparing the difluoroxalatostannate(II) complexes of this invention involves the use of the alkali metal oxalate and stannous fluoride. One mole of the metal oxalate (sodium or potassium oxalate) is slowly added to a solution containing one mole of stannous fluoride. The pH of the solution at that point will be found to be 4.8.

The products of the reactions described above, were separated from their respective solutions through evaporation to almost dryness followed by precipitation by alcohol and dessication under a vacuum over silca gel. The resulting products were white crystalline solids. They are extremely soluble in water, but insoluble in alcohol. Solutions of these compounds are clear at pHs up to approximately 5.5. Above pH 5.5 a whitening of the solution occurs, and a white precipitate can be observed. Some whitening also occurs at pH 5.0 as a function of solution aging.

Further, it was noted that the sodium complex, sodium difluoroxalatostannate(II), $Na_2[SnF_2(C_2O_4)]$, has a melting point between 280° and 285°C., and the potassium complex, potassium difluoroxalatostannate(II), $K_2[SnF_2(C_2O_4)]$, has a melting point between 230° and 240°C.

Sodium difluoroxalatostannate(II) may be conveniently prepared by mixing 10.0 g of stannous oxalate into 100 ml of redistilled water. 4.06 g of sodium fluoride are mixed into the solution. The product of this reaction may be separated by evaporation as discussed above. Similarly, potassium difluoroxalatostannate(II) may be conveniently prepared by mixing 10 g of stannous oxalate into 100 ml of redistilled water and mixing into that solution 5.6 g of potassium fluoride. 9.2 g of potassium fluoride dihydrate ($KF \cdot 2H_2O$) can be substituted for the 5.6 g of potassium fluoride in this latter reaction. The products of these reactions may be separated by evaporation as discussed above. Following a similar procedure, the ammonium difluoroxalatostannate(II) may be conveniently prepared by dissolving 4.13 g stannous fluoride in 200 ml distilled water. While stirring this mixture, 3.72 g ammonium oxalate monohydrate is added. The products of this reaction may be separated by evaporation as discussed above.

It was further observed, by X-ray diffraction, that the product of the reaction of sodium oxalate and stannous fluoride was identical to that formed by stannous oxalate and sodium fluoride. Similarly, the product of potassium oxalate and stannous fluoride was identical to that obtained with stannous oxalate and potassium fluoride. Both potassium difluoroxalatostannate(II) and sodium difluoroxalatostannate(II) have been characterized according to the conventional Hull-Debye-Scherrer X-ray diffraction powder technique in order to produce a film record. Exposures were made using standard X-ray diffraction camera (diameter 114.7 mm). As is well known to one skilled in the art, the technique causes crystalline materials to diffract X-rays according to a pattern specific for each compound. The X-rays expose a film according to a specific pattern, which appears on the film as characteristic lines, the interplanar spacing and the relative intensity of which may be measured in order to identify the compound. The pattern for potassium stannous fluoroxalate and sodium stannous fluoroxalate are distinctive and distinguish these compounds from other compounds, particularly the starting materials from which they are made.

ORAL COMPOSITIONS COMPRISING DIFLUOROXALATOSTANNATE(II) COMPLEXES

The difluoroxalatonstannate(II) complexes of this invention have demonstrated utility as anticariogenic agents for use in oral compositions which comprise carriers such as abrasives, water, and other nontoxic materials, in addition to the difluoroxalatostannate(II) complexes of this invention. The compounds of this invention may be applied to the teeth in simple aqueous solution form (as a topical treatment or in the form of an aqueous mouthwash). However, they are also well suited for use in other oral compositions for caries prophylaxis (e.g., dentifrices and prophylaxis pastes) which contain one or more ionically compatible adjuvants. In general, oral compositions produced in accordance with the present invention comprise from about 0.1 to about 10 percent by weight of one or more difluoroxalatostannates.

Oral compositions designed for relatively frequent use, such as dentifrices and mouthwashes, will contain lower levels of difluoroxalatostannate(II) complexes than compositions which are applied less frequently (e.g., prophylactic pastes and topical solutions). Thus, dentifrices preferably contain from about 0.1 percent up to about 1.5 percent by weight of difluoroxalatostannate(II) complexes, whereas prophylaxis pastes preferably comprise about 2 to 10 percent metal difluoroxalatostannate(II) complexes by weight and aqueous topical solutions preferably comprise about 1.0 to 8.0 percent difluoroxalatostannate(II) complexes.

The cleaning and polishing material in dentifrices of this invention should be ionically compatible with tin(II) and fluoride ions and can comprise from about 20 to 95 percent by weight of the total composition. Preferably, toothpastes contain from 20 to 60 percent cleaning and polishing agent by weight, and tooth powders contain from 60 to 95 percent by weight. Examples of suitable cleaning and polishing agents suitable for use in a dentifrice include, without limitation, calcium pyrophosphate, $Ca_2P_2O_7$; calcium hydrogen phosphate dihydrate, $CaHPO_4 \cdot 2H_2O$; insoluble sodium metaphosphate, $(NaPO_3)_x$ calcium carbonate, $CaCO_3$; melamine formaldehyde resins (U.S. Pat. No. 3,070,510); and preferably zirconium silicate and mixtures of zirconium silicate with other cleaning and polishing agents as disclosed in U.S. Pat. No. 3,450,813. Mixtures of these cleaning and polishing agents may also be used.

Toothpastes require a binder substance to impart desired texture properties. Natural gum binders such as gum tragacanth, gum karaya, gum arabic, etc., and seaweed derivatives such as Irish moss, and alginates, and water soluble cellulose derivatives such as hydroxyethyl cellulose and sodiumcarboxymethyl cellulose, can be used for this purpose. Desirably those materials are employed which are most compatible with the fluoride ion. Binders which have no ionic groups, such as hydroxyethyl cellulose, are especially preferred. Improvements in texture can also be attained by including an additional material such as colloidal magnesium aluminum silicate.

Thickening agents in an amount of from 0.5 to 5.0 percent by weight can be used to form a satisfactory toothpaste.

Toothpaste conventionally contains sudsing agents. Suitable sudsing agents include, but are not limited to, water-soluble alkyl sulfates having from eight to 18 carbon atoms in the alkyl radical, such as sodium lauryl sulfate, water-soluble salts of sulfonated monoglycerides, fatty acids having from 10 to 18 carbon atoms in the alkyl radical such as sodium coconut monoglyceride sulfonate, salts of the fatty acid amides of taurines such as sodium-N-methyl palmitoyl tauride, and salts of fatty esters of isethionic acid.

Sudsing agents can be used in the compositions of this invention in the amount from about 0.5 percent to about 5.0 percent by weight of the total composition.

It is also desirable to include some humectant material in toothpaste to keep it from hardening. Materials commonly used for this purpose include glycerine, sorbitol and other polyhydric alcohols. Humectants can comprise up to 35 percent of the toothpaste composition.

Flavoring materials may be included in the toothpaste formulation, including small amounts of oils of wintergreen and peppermint, and sweetening agents such as saccharine, dextrose and levulose.

Exemplary dentifrice formulations are given in the following examples.

EXAMPLE I

| Constituent | Percent by Weight |
| --- | --- |
| Potassium difluoroxalatostannate(II) | 0.87 |
| Distilled water | 18.00 |
| Sorbitol | 29.00 |
| Buffer (KH Phtalate) | 1.20 |
| Fumaric Acid | 0.15 |
| Victamide* | 3.46 |
| Ammonium hudroxide (to adjust pH) | 0.61 (approx.) |
| Veegum | 0.40 |
| Sodium alkyl sulfate | 2.10 |
| Calcium pyrophosphate | 32.00 |
| Zirconium silicate | 10.50 |
| Binder (Keltrol) | 1.00 |
| Saccharin | 0.08 |
| Flavor | 0.61 |
| | 100.00 |

*An ammonium salt of a condensation product of $NH_3$ and $P_4O_{10}$ commercially available from the Victor Chemical Company under the trademark "Vitamide", e.g.,

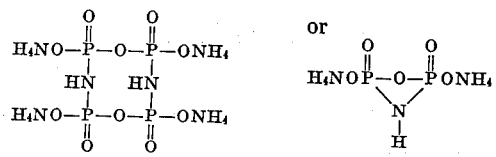

EXAMPLE II

| Constituent | Percent by Weight |
| --- | --- |
| Potassium difluoroxalatostannate(II) | 0.87 |
| Distilled water | 20.00 |
| Sorbitol | 13.00 |
| Buffer (KH Phtalate) | 1.20 |
| Fumaric Acid | 0.20 |
| Ammonium hydroxide (to adjust pH) | 0.33 (approx.) |
| Veegum | 0.40 |
| Sodium laryl sulfate | 1.80 |
| Acid washed talc | 30.00 |
| Zirconium silicate | 12.00 |
| Glycerin | 15.00 |
| Binder (CMC) | 4.50 |
| Flavoring agents | 0.68 |
| | 100.00 |

EXAMPLE III

| Constituent | Percent by Weight |
| --- | --- |
| Sodium difluoroxalatostannate(II) | 0.74 |
| Distilled water | 18.00 |
| Sorbitol | 13.60 |
| Buffer (KH Phtalate) | 1.20 |
| Hydroxyethylenediaminotetraacetic acid | 0.10 |
| Ammonium hydroxide (to adjust pH) | 0.75 (approx.) |
| Veegum | 0.40 |
| Sodium alkyl aryl sulfonate | 2.00 |
| Resin abrasive* | 42.00 |
| Glycerin | 15.50 |
| Carboxymethylcellulose | 5.00 |
| Flavoring agents | 0.70 |
| | 100.00 |

*U. S. Patent No. 3,070,510

EXAMPLE IV

| Constituent | Percent by Weight |
| --- | --- |
| Ammonium difluoroxalatostannate(II) | 0.72 |
| Distilled water | 18.00 |
| Glycerin | 15.00 |
| Sorbitol | 15.00 |
| Buffer (KH Phtalate) | 1.20 |
| Fumaric acid | 0.20 |
| Potassium hydroxide (to adjust pH) | 0.78 (approx.) |
| Veegum | 0.40 |
| Sodium alkyl sulfate | 2.00 |
| Dicalcium phosphate dihydrate | 33.55 |
| Dicalcium phosphate, anhydrous | 7.45 |
| CMC (binder) | 5.00 |
| Flavoring agents | 0.70 |
| | 100.00 |

EXAMPLE V

| Constituent | Percent by Weight |
| --- | --- |
| Sodium difluoroxalatostannate(II) | 0.75 |
| Distilled water | 22.00 |
| Sorbitol | 12.00 |
| Methyliminodiacetic acid | 0.10 |
| Buffer (KH Phtalate) | 1.20 |
| Imidazole (to adjust pH) | 0.85 (approx.) |
| Sodium lauryl sulfate | 2.00 |
| Calcium pyrophosphate | 42.00 |
| Veegum | 0.40 |
| Glycerin | 14.00 |
| CMC | 4.00 |
| Flavoring agents | 0.70 |
| | 100.00 |

An exemplary formulation of a nonabrasive dentifrice is given in the following examples.

EXAMPLE VI—(Non-Abrasive Dentifrice)

| Constituent | Percent by Weight |
| --- | --- |
| Potassium difluoroxalatostannate(II) | 0.87 |
| Distilled water | 40.00 |
| Sorbitol | 30.00 |
| Fumaric acid | 00.15 |
| Buffer (KH Phtalate) | 1.00 |
| Imidazole (to adjust pH) | 0.26 (approx.) |
| Sodium alkyl sulfonate | 2.00 |
| Glycerin | 19.00 |
| Keltrol | 6.00 |
| Flavoring agents | 0.70 |
| | 100.00 |

EXAMPLE VII—(Non-Abrasive Dentifrice)

| Constituent | Percent by Weight |
| --- | --- |
| Sodium difluoroxalatostannate(II) | 0.75 |
| Distilled water | 35.00 |
| Sorbitol | 35.00 |
| Victamide | 3.46 |
| Fumaric acid | 0.20 |
| Ammonium hydroxide (to adjust pH) | 0.59 (approx.) |
| Sodium lauryl sulfate | 2.00 |
| Glycerin | 17.50 |
| CMC | 5.00 |
| Flavoring agents | 0.50 |
| | 100.00 |

Prophylactic paste compositions containing metal difluoroxalatostannate(II) complex compounds constitute another preferred embodiment of this invention. Such prophylactic paste compositions contain the usual components, including a compatible abrasive such as lava pumice or especially zirconium silicate at a level of about 30 to 80 percent by weight to form a prophylactic paste composition for use by dentists or dental hygienists in periodic cleaning and polishing of the teeth.

Exemplary prophylactic pastes are given in the following examples.

EXAMPLE VIII—(Prophylactic paste)

| Constituent | Percent by Weight |
|---|---|
| Potassium difluoroxalatostannate(II) | 8.95 |
| Aluminum oxide | 58.00 |
| Water | 18.75 |
| Glycerin | 2.00 |
| Sorbitol | 2.50 |
| Veegum | 0.65 |
| Keltrol | 1.20 |
| Titanium dioxide | 1.00 |
| Sodium trimetaphosphate | 6.00 |
| Flavoring agents | 0.95 |
| | 100.00 |

EXAMPLE IX—(Prophylactic paste)

| Constituent | Percent By Weight |
|---|---|
| Sodium difluoroxalatostannate(II) | 10.60 |
| Zirconium silicate | 49.00 |
| Stannous oxide | 5.00 |
| Water | 20.00 |
| Glycerin | 2.50 |
| Sorbitol | 2.00 |
| Veegum | 0.70 |
| CMC | 1.20 |
| Sodium trimetaphosphate | 8.00 |
| Flavoring agents | 1.00 |
| | 100.00 |

ANTICARIOGENIC EFFECTIVENESS

The anticariogenic effectiveness of alkali metal stannous fluoroxalate complexes may be demonstrated by the in vitro tests which whole human teeth or the in vivo dental caries experience in rats (standard experimental animals for anticariogenic studies). The effect of various compositions in reducing the rate of dissolution of dental enamel in acid is also a reliable indicator of anticariogenticy. The effect of different dental compositions on the rate of acid dissolution of enamel may be determined by a number of tests well known in the art. The particular test described herein comprises a comparison of acid dissolution of a given tooth after an in vitro treatment with a given test composition. The comparison is expressed as ESR, that is, enamel solubility reduction and the procedure employed is well accepted and has been described in detail previously (Buttner and Muhler, J. D. Res., 36:897, 1957).

The results of tests utilizing solutions comprising potassium difluoroxalatostannate(II) having a fluoride ion content of at least 1,000 ppm and a pH of 5.0 are presented in Table 1. These data illustrate an ESR of approximately 95.4 percent or more. These data illustrate that the difluoroxalatostannate(II) complexes demonstrate substantial anticariogenic efficacy, and further, substantial anticariogenic efficacy over and above stannous fluoride, $SnF_2$, which in the same test provides ESR results ranging from 75 to 85 percent.

TABLE 1

In vitro ESR on whole human enamel using four methods of preparing the fluoroxalate complex at a concentration such as to provide 1,000 p.p m F

| | Fluoroxalate system prepared with— | pH* | Mg phosphorus released Before treatment | Mg phosphorus released After treatment | Percent ESR ± standard error |
|---|---|---|---|---|---|
| 1 | Sn oxalate plus $KF·2H_2O$ | 5.0 | 16.99 | .28 | 98.1±1.9 |
| 2 | Oxalic acid plus $SnF_2$ + KOH | 5.0 | 23.68 | .18 | 98.8±1.5 |
| 3 | Sn oxalate plus HF + KOH | 5.0 | 20.80 | .74 | 96.3±1.0 |
| 4 | $K_2$ Oxalate plus $SnF_2$ | 5.0 | 24.14 | .84 | 97.8±2.2 |
| 5 | $(NH_4)_2$ oxalate plus $SnF_2$ | 5.0 | 23.50 | 1.11 | 95.4±1.8 |

*The pH was adjusted to 5.0 with diluted OH.

Rat tooth ESR may be determined in vivo as follows. The teeth of a group of suitably selected test rats are given three 30-second topical applications at 30-minute intervals with solutions containing various alkali metal stannous fluoroxalate complexes. The animals are sacrificed 1 hour after the last treatment. Each mandibular hemijaw is removed, the clinical crowns of each are decalcified in 0.2N($pH_4$) sodium acetate buffer for 20 minutes, and the decalcification solutions are analyzed for phosphorus by a colorimetric method (Fisk and Subbarow, "The Colorimetric Determination of Phosphorus," Journal of Biological Chemistry, 66:375, 1925). Phosphorus liberation of the teeth topically treated with the various alkali metal stannous fluoroxalate containing solutions was compared to that of teeth similarly treated with distilled water control solutions, and the result of such comparison is reported as a percentage reduction of enamel solubility (i.e., rat ESR). Table 2 presents the results of tests conducted using solutions of sodium and potassium difluoroxalatostannate(II) having a fluoride content of 1,000 ppm. The data show an ESR value of over 74 percent for the fluoroxalatostannate complexes, as compared to control animals to which distilled water was applied. By way of comparison, the ESR effectiveness of a stannous fluoride solution containing 1,000 ppmF in the same test was 44.3 percent.

TABLE 2

The Effect of Different Fluoride Compounds in Aqueous Solution Upon the Rate of Acid Dissolution of Rat Enamel Procedure:
1. 5 rats were used per group.
2. The animals were given three, thirty-second topical applications with the freshly prepared solutions. The pH was adjusted as needed with .1 N NaOH.
3. One hour after the final topical the animals were sacrificed, the hemijaws removed and the rate of dissolution of enamel determined as a function of the amount of phosphorus removed from the hemijaws by 20-minute immersion in a .1 N, pH 4.0 acetate buffer.

| Solution tested | pH | No. hemijaws | Mean µg P released | ESR (in percent) |
|---|---|---|---|---|
| 1. Control—distilled water | Nat. | 10 | *84.75±4.1 | |
| 2. Stannous fluoride (1,000 p.p.m. F). | 5.0 | 10 | 47.22±3.3 | 44.28 |
| 3. Sodium difluoroxalatostannate (II) (1,000 p.p.m. F). | 5.0 | 10 | 21.35±1.5 | 74.81 |
| 4. Potassium difluoroxalatostannate (II) (1,000 p.p.m. F). | 5.0 | 10 | 19.03±1.2 | 77.55 |

*Standard error of the mean.

Similar tests were performed using a dentifrice in vivo as follows. The teeth of a group of suitably selected test rats are given 30-second applications at 30-minute intervals of a dentifrice with an active anticariogenic system composed of potassium difluoroxalatostannate(II) complexes, (F=1000 ppm), 0.15 percent fumaric acid and 2.5 percent victamide. The dentifrice has a pH of approximately 4.6. The animals are sacrificed 1 hour after the last brushing, and the ESR determined in accordance with the above procedure. The results of this test are presented in Table 3. These data illustrate an ESR value of 70 percent or better as compared to control animals. These data also illustrate that a commercially available fluoride containing dentifrice resulted in an ESR of 29 percent as compared to the control animals. Therefore, these data illustrate that a stannous difluoroxalatostannate(II) complex containing dentifrice has substantial anticariogenic efficacy and substantial anticariogenic efficacy over commercially available fluoride containing dentifrices.

TABLE 3

The effect of different dentifrice formulations upon the rate of enamel dissolution in the rat.

Procedure:
1. 5 animals were used per group.
2. The animals were given three thirty-second brushings.
3. One hour after the final brushing the animals were sacrificed, the hemijaws removed and the rate of dissolution of enamel determined as a function of the amount of phosphorus removed from the hemijaws by a 20-minute immersion period in a .1 N, ph 4.0 acetate buffer solution.

| Dentifrice | Brushing, pH | No. hemijaws | Mean µg phosphorus | Percent ESR |
|---|---|---|---|---|
| Control (no active system) | 7.0 | 10 | *88.72±5.5 | |
| $SnF_2$-calcium pyrophosphate (F=1,000 p.p.m.) | 4.7 | 10 | 62.69±3.8 | 28.98 |
| $K_2$ difluoroxalatostannate (II) (F=1,000 p.p.m.) | 4.6 | 10 | 26.17±1.8 | 70.35 |

*Standard error of the mean.

ANIMAL TOXICITY

In addition to exhibiting a high level of anticariogenic effectiveness, the difluoroxalatostannate(II) complexes of the present invention may be safely utilized in animal organisms without any dangerous side effects. The toxicity of difluoroxalatostannate(II) salts compare quite favorably with the other anticariogenic fluorides as shown by the following experimental studies. The acute toxicity of the difluoroxalatostannate(II) complexes has been determined in mice (standard experimental animals for this purpose), and these data are given in Table 4. The toxicity is expressed in terms of an $LD_{50}$, which is the lethal does for 50 percent of the animals treated (within 24 hours).

TABLE 4

Comparative Acute Toxicity Data in Mice

| Fluoride Compound | Route of Administration | $LD_{50}$ Dosage mg/F/kg Body Weight | Mg Cpd/kg Body Weight |
|---|---|---|---|
| NaF | Oral | 36 | 80 |
| $SnF_2$ | Oral | 35–36 | 145–150 |
| $K_2[SnF_2(C_2O_4)]$ | Oral | 52 | 443 |
| $Na_2[SnF_2(C_2O_4)]$ | Oral | 61 | 468 |

Based on the data of Table 4 it would appear that the acute $LD_{50}$ of potassium difluoroxalatostannate(II) is about 52 mg F/kg body weight and the $LD_{50}$ of sodium difluoroxalatostannate(II) is about 61 mg F/kg body weight. In comparison, the acute $LD_{50}$ value for sodium fluoride is 36 mg F/kg body weight.

Thus, the difluoroxalatostannate(II) salts of this invention represent a substantial advance in the dental arts and provide safe and effective adjuvants for use in oral compositions for dental caries prophylaxis.

I claim:

1. Oral compositions for dental caries prophylaxis comprising:
   about 0.1 to 10.0 percent by weight of at least one difluoroxalatostannate of the formula $M_2[SnF_2(C_2O_4)]$ where M is a member selected from the group consisting of sodium, potassium and ammonium; and
   a carrier suitable for use in the oral cavity.

2. Oral compositions, as claimed in claim 1, for dental caries prophylaxis comprising:
   about 0.1 to 10.0 percent by weight of at least one difluoroxalatostannate of the formula $M_2[SnF_2(C_2O_4)]$ where M is sodium.

3. Oral compositions, as claimed in claim 1, for dental caries prophylaxis comprising:
   about 0.1 to 10.0 percent by weight of at least one difluoroxalatostannate of the formula $M_2[SnF_2(C_2O_4)]$ where M is potassium.

4. Oral compositions, as claimed in claim 1, for dental caries prophylaxis comprising:
   about 0.1 to 10.0 percent by weight of at least one difluoroxalatostannate of the formula $M_2[SnF_2(C_2O_4)]$ where M is ammonium.

5. An oral composition, as claimed in claim 1, wherein the composition is a dentifrice and wherein the difluoroxalatostannate is present at a level from about 0.1 to 1.5 percent by weight.

6. An oral composition, as claimed in claim 5, further comprising about 20 to 60 percent of at least one compatible cleaning and polishing agent.

7. An oral composition, as claimed in claim 6, where M is sodium.

8. An oral composition, as claimed in claim 6, where M is potassium.

9. An oral composition, as claimed in claim 6, where M is ammonium.

10. An oral composition, as claimed in claim 1, wherein the composition is prophylactic paste and wherein the difluoroxalatostannate is present at a level from about 2 to 10 percent by weight.

11. An oral composition, as claimed in claim 10, further comprising about 20 to 95 percent of a compatible cleaning and polishing agent.

12. An oral composition, as claimed in claim 10, where M is sodium.

13. An oral composition, as claimed in claim 10, where M is potassium.

14. An oral composition, as claimed in claim 10, where M is ammonium.

15. An oral composition, as claimed in claim 1, wherein the composition is an aqueous solution adapted for direct topical application to the teeth comprising about 1 to 8 percent by weight difluoroxalatostannate.

16. An oral composition, as claimed in claim 15, where M is sodium.

17. An oral composition, as claimed in claim 15, where M is potassium.

18. An oral composition, as claimed in claim 15, where M is ammonium.

19. A method for increasing the dental caries resistance of teeth comprising the application thereto of an oral composition for caries prophylaxis comprising about 0.1 to 10.0 percent by weight of at least one metal difluoroxalatostannate of the formula $M_2[SnF_2(C_2O_4)]$, where M is a member selected from the group consisting of sodium, potassium, and ammonium.

* * * * *